US011443576B2

(12) United States Patent
Spitzer

(10) Patent No.: US 11,443,576 B2
(45) Date of Patent: Sep. 13, 2022

(54) SYSTEM AND METHOD FOR BAGGAGE CONTROL

(71) Applicant: Flughafen Wien Aktiengesellschaft, Wein (AT)

(72) Inventor: Franz Spitzer, Litschau (AT)

(73) Assignee: FLUGHAFEN WIEN AKTIENGESELLSCHAFT, Wein (AT)

( * ) Notice: Subject to any disclaimer, the term of this patent is extended or adjusted under 35 U.S.C. 154(b) by 0 days.

(21) Appl. No.: 17/617,774

(22) PCT Filed: Jun. 11, 2019

(86) PCT No.: PCT/EP2019/065199
§ 371 (c)(1),
(2) Date: Dec. 9, 2021

(87) PCT Pub. No.: WO2020/249192
PCT Pub. Date: Dec. 17, 2020

(65) Prior Publication Data
US 2022/0207944 A1 Jun. 30, 2022

(51) Int. Cl.
*G07C 9/00* (2020.01)
*G07C 9/25* (2020.01)
*B64F 1/36* (2017.01)

(52) U.S. Cl.
CPC .............. *G07C 9/257* (2020.01); *B64F 1/368* (2013.01); *G07C 9/00563* (2013.01); *G07C 9/00896* (2013.01)

(58) Field of Classification Search
None
See application file for complete search history.

(56) References Cited

U.S. PATENT DOCUMENTS

| 7,193,515 | B1 | 3/2007 | Roberts et al. |
| 10,474,897 | B2 * | 11/2019 | Xu ........................ G06Q 50/265 |
| 2007/0029165 | A1 | 2/2007 | Bender et al. |
| 2012/0228377 | A1 | 9/2012 | Carpenter et al. |

FOREIGN PATENT DOCUMENTS

| DE | 102009022716 A1 | 12/2010 |
| EP | 3147840 A1 | 3/2017 |

OTHER PUBLICATIONS

International Patent Application No. PCT/EP2019/065199, International Search Report with English Translation dated Mar. 4, 2020, 6 pages.

* cited by examiner

*Primary Examiner* — K. Wong
(74) *Attorney, Agent, or Firm* — Leber IP Law; David C. Robertson

(57) ABSTRACT

The invention relates to a system and a method for identity and baggage control at a transition from a public area to a restricted area, between which a control area is provided, which comprises a baggage check-in area, an identity control area, a baggage control area as well as a baggage reclaim area and a data processing unit.

18 Claims, 3 Drawing Sheets

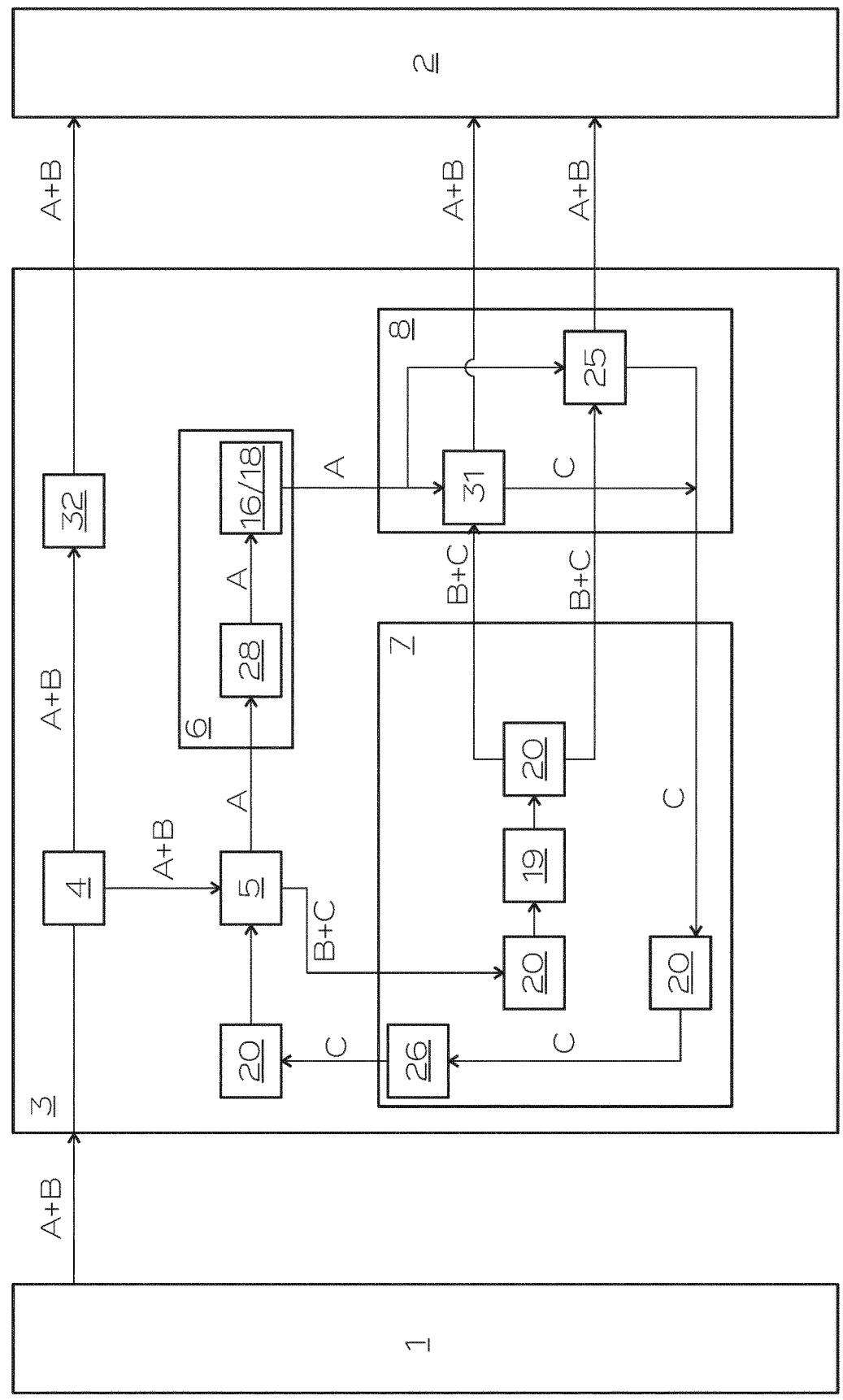

SYSTEM AND METHOD FOR BAGGAGE CONTROL

RELATED APPLICATIONS

This application is a national phase entry of International Patent Application No. PCT/EP2019/065199, filed Jun. 11, 2019, the entire disclosures of which is incorporated herein by reference.

FIELD OF INVENTION

The present invention relates to a system and a method for controlling baggage according to the preamble of the independent patent claims.

BACKGROUND

Many public facilities, in particular public transport facilities such as airports, have separate sections with a control area between them. A passenger at an airport first enters a public area, then passes the control area, in which a safety check takes place, and, subsequently, enters a restricted area. In this restricted area, the departure hall or individual departure gates may be located.

On the one hand, such a safety check serves to check the access authorization of a person to the restricted area and, on the other hand, to guarantee that no unauthorized items enter the restricted area. To this end, the person themselves and their baggage are typically subjected to a safety check.

In the prior art, the safety control typically takes place in such a way that a person places their baggage in a baggage carrier, whereupon the baggage and the person undergo a safety check separately of each other.

However, such known control systems are inefficient since the control of the person and their baggage are directly connected. A person may enter the control area only once their baggage has entered the control area as well; similarly, the person may leave the control area only once their baggage has passed the control area. By coupling identity and baggage control, unnecessary waiting times are caused and the systems are inefficient.

Further, the baggage is substantially freely accessible during the control so that there is a danger of theft.

Control devices for baggage are known in the prior art. Conventional systems, such as those known from airports, are described in DE 10 2009 022716 A1 and in US 2007/029165 A1. Advanced systems that use electronic information processing and, in some cases, biometric data to identify passengers and assign items of baggage are described in US 2012/228377 A1, EP 3147840 A1 or U.S. Pat. No. 7,193,515 B1.

The problem of systems and methods of the prior art, especially of the system of US 2012/228377 A1, is that it is not checked whether all items of luggage have been removed by the passengers or dirt has been left behind.

SUMMARY

The object of the present invention is to overcome the disadvantages of the prior art and to create a system and a method for controlling people and baggage, which allows a higher efficiency and a higher throughput regarding people and baggage and which stores the baggage as safely as possible during the control.

This and other objects of the invention are solved by a system and a method according to the independent patent claims.

The invention provides a system for identity and baggage control at a transition from a public area to a restricted area, between which a control area is provided, which comprises a baggage check-in area, an identity control area, a baggage control area as well as a baggage reclaim area. Further, a data processing unit is provided, which comprises a central control unit with a CPU, a volatile memory (RAM), a nonvolatile memory (ROM) and communication interfaces, for example. The communication interfaces may be TCP/IP network interfaces, USB interfaces, serial interfaces and the like for communicating with the different units of the system according to the invention. The data processing unit is not restricted to a central computer, but may also be configured as a distributed client server system with different computer units in different, separated security levels.

The invention provides that the baggage control area is structurally separated from the identity control area. In particular, the structural separation may be designed such that the people in the identity control area cannot access the baggage in the baggage control area.

In the baggage check-in area a check-in identification unit is arranged, which is configured to determine biometric features of a person, to generate an unambiguous biometric token therefrom and to transmit the token to the data processing unit.

The check-in identification unit may, for example, be a camera, a microphone, a fingerprint sensor or combinations of these devices, which are configured to detect biometric features such as particular physical features, facial features, features relating to the iris, retinal features, vocal features and/or fingerprints of a person.

Preferably, the biometric token may be an alphanumeric code encrypted by a one-way function. In particular, it may be provided that the biometric data of the person from the token are not reproducible. The generation of the biometric token may have multiple stages, wherein, in a first step, biometric features are quantified, and, in a second step, the biometric token is created from the quantified features by means of a one-way function, e.g. a mathematical hash operation.

Further, a check-in unit is provided, which is connected to the check-in identification unit and configured to provide a baggage carrier with an unambiguous baggage ID for receiving baggage from the person. The baggage carrier may be designed as a closable box, for example, on which the baggage ID is arranged in the form of a machine-readable code. The check-in unit may be provided in the immediate vicinity of the check-in identification unit or integrated into it. The check-in unit may be configured to detect the deposition of the baggage inside it and to then lock the baggage carrier.

The baggage ID of the provided baggage carrier is transmitted to the data processing unit by the check-in unit or the check-in identification unit. It may be provided that the check-in identification unit transmits both the biometric token of the person and the baggage ID of the provided baggage carrier to the data processing unit, e.g. via an encrypted TCP/IP connection, in particular an SSL connection.

The data processing unit comprises communication interfaces, which are configured to receive the biometric token and the baggage ID. In the internal control unit, these data are associated with each other and optionally stored in a correlation table in the nonvolatile memory. In the correlation table, the baggage ID of one or more provided baggage carriers are associated with the unambiguous biometric token of a person. The system according to the invention enables one or more items of baggage to be associated with a person automatically.

In alternative embodiments of the invention, the registration of the biometric token of the person takes place already prior to checking-in the baggage, for example upon entering the control area or upon checking-in so that the biometric token is already stored in the correlation table, optionally with further information. In this case, the data processing unit does not have to store the biometric token, but checks the existence of the biometric token in the correlation table and optionally matches the right baggage ID to the corresponding biometric token.

The correlation table may contain multiple pieces of information. In particular, in addition to the biometric token and the baggage ID(s), the following may be provided:
- a continuous numbering of the datasets,
- an unambiguous identification of the check-in unit and the time of the baggage check-in,
- an unambiguous identification of the person,
- features from external systems such as the access code of the boarding pass and booked flight dates,
- an unambiguous identification of the imaging examination unit used for the control of the baggage, in particular CT scanner,
- the decision whether a manual follow-up control of the baggage is to take place,
- the decision whether an intermediate buffering of the baggage is to take place,
- an unambiguous identification of the reclaim unit and the time of the baggage removal,
- an unambiguous identification of the employee who has carried out the manual follow-up control and of the time of the manual follow-up control, and/or
- the status of the emptied baggage carrier.

Having checked in their baggage, the person passes the identity control area in the conventional manner, while the baggage of the person in the baggage carrier passes a structurally separate baggage control area. Having passed the identity control area, the person enters the baggage reclaim area.

In the baggage reclaim area, a baggage reclaim station is arranged. It comprises a reclaim identification unit, which is configured to determine biometric features of the person, to generate an unambiguous biometric token therefrom and to transmit the token to the data processing unit. The method for determining the biometric token is preferably identical to the method used in the check-in identification unit.

The reclaim identification unit may, for example, be a camera, a microphone, a fingerprint sensor or combinations of these devices, which are configured to detect biometric features such as particular physical features, facial features, features relating to the iris, retinal features, vocal features and/or fingerprints of a person. It may again be provided that the biometric features for obtaining the biometric token are encrypted by a one-way function.

According to the invention, the data processing unit is configured to receive the biometric token. Optionally, the token may be checked for validity. The validity check may in particular take place in such a way that it is checked whether the token is already registered in the correlation table. If the token is valid, the data processing unit determines the associated baggage ID or, in the case of multiple associated baggage carriers, the baggage IDs of these baggage carriers on the basis of the stored correlation table and transmits them to the baggage reclaim station via suitable communication interfaces.

The invention further provides a reclaim unit, which is connected to the baggage reclaim station and is configured to receive the baggage ID from the data processing unit and to provide the baggage carrier(s) with the corresponding baggage ID. The reclaim unit may be configured to unlock the baggage carrier and to detect the removal of the baggage. The person may remove their baggage from the baggage carrier and leave the control area while the empty baggage carrier is guided back.

The baggage ID may comprise at least one machine-readable value. The baggage ID may be an alphanumeric value, a machine-readable code, e.g. a bar code or a QR code, or the like. However, the baggage ID may also be stored on an electronic storage medium and may in particular be wirelessly readable, e.g. in the form of an RFID tag.

Optionally, it may be provided that the control area comprises an access control area in order to control a person attempting to enter the control area beforehand. This may in particular be necessary when implementing a system according to the invention at an airport in order to check a person's authorization to enter a certain gate on the basis of their boarding pass.

The invention may provide that a scanner is provided in the access control area, which is configured to read a machine-readable access code on an authentication document of a person, e.g. a passport and/or a boarding pass, and to transmit it to the data processing unit for checking the validity.

The data processing unit may be configured to check the validity of the access code and to transmit the result of the validity check to a blocking device in the access control area. For this purpose, the data processing unit and the blocking device may again be provided with corresponding interfaces. The blocking device may be configured to allow the person access to the baggage check-in area provided that the access code is valid and to deny it otherwise.

In the access control area, boarding passes, for example, or similar documents may be checked and/or read. Preferably, a document can only be used once. This means that another person attempting to use the same document in the access control area is not allowed access.

According to the invention, the access control area may be arranged before the baggage check-in area. It may be provided that an identification unit is already provided in the access control area, which is configured to determine the biometric features of the person, to generate an unambiguous biometric token therefrom and to transmit the token to the data processing unit, which then stores the biometric token in the correlation table for the first time. Thus, the initial storage of the biometric token may take place in the access control area, the baggage check-in area or in other areas, e.g. the check-in area.

The invention may provide that the data processing unit is configured to associate the biometric token and the baggage ID with the transmitted access code in the correlation table. This allows the baggage, the biometric token of the person and the access code to be associated unambiguously. It is understood that further data and features may also be associated with the biometric token of the person in the correlation table.

Optionally, it may be provided that further identification units, in particular cameras, are provided in the access control area and/or in the identity control area, the identification units being configured to recognize biometric data of a person, in particular non-contact features such as physical features or facial features, to derive biometric data therefrom and to transmit it to the data processing unit. This allows the determination of the approximate location of a person in the control area at all times.

Optionally, it may be provided that the baggage reclaim area comprises multiple, spatially separated baggage reclaim stations. This way, spatially separated sub-areas are created in the baggage reclaim area, to which only authorized persons are allowed access. This allows for a protected environment at baggage reclaim.

Optionally, it may be provided that, preferably in the identity control area, an information output unit is provided, which is configured to output and/or display content of the correlation table. The information output unit may be configured as an information pillar with a display, for example. Based on the biometric features of a person, but also based on other features, e.g. the machine-readable access code, it may display the position of the corresponding baggage.

To achieve better control of the flow of people after the identity control, it may be provided that the system comprises multiple separated baggage reclaim areas. In this case, the information output unit may notify the person about the baggage reclaim area in which the associated baggage carrier(s) is/are provided. It may also be provided that multiple baggage reclaim stations are arranged in each baggage reclaim area.

In this case, the information output unit may notify the person about the baggage reclaim stations of the respective baggage reclaim area in which the associated baggage carrier(s) is/are provided.

This is advantageous in that the baggage carriers may be more efficiently distributed. For example, certain individuals may always be provided with their baggage carriers at preferred baggage reclaim stations in order to keep their waiting time particularly short. Further, in the case of far-away baggage reclaim stations, the baggage carriers may be retained in a buffer zone for a predetermined waiting time in order not to block the baggage reclaim stations. Both the distance and the estimated waiting time for the baggage carrier(s) may be displayed on the information output unit.

Optionally, it may be provided that at least one imaging examination unit, preferably a CT scanner, is arranged in the baggage control area. The advantage of a CT scanner is that a three-dimensional analysis of the baggage allows tighter stacking of multiple items of baggage while maintaining the quality of examination. In or outside of the baggage control area, a follow-up examination area may be provided in order to allow for manual analysis of the baggage.

For transporting the baggage carriers, any conveyor system, e.g. a revolving conveyor belt, is provided, which passes from the baggage check-in area to the baggage reclaim area via the baggage control area and back to the baggage check-in area.

A separate conveyor belt control system may be provided, which is designed to communicate with the data processing unit and comprises accordingly adapted interfaces. The conveyor belt control system may in particular be controlled by the data processing unit.

Preferably, multiple baggage reclaim stations are provided, wherein a switch arrangement, which is controlled by the conveyor belt control system and connected thereto, is provided for distributing the baggage carriers to the baggage reclaim stations.

According to the invention, a control device, which is designed to determine the load condition and the degree of contamination of a baggage carrier, is provided on the conveyor belt after the baggage reclaim area. The control device may in particular allow to check whether a baggage carrier has been emptied completely. In case items are detected in the baggage carrier, a warning may be output.

In the baggage reclaim area, in particular in the area of a baggage reclaim station, a buffer zone may be provided for intermediate storage of baggage carriers. This helps to avoid a congestion of baggage carriers in the event of an increased number of people.

The invention may provide that the baggage carrier can be locked, wherein the check-in unit is designed to lock the baggage carrier and the reclaim unit to unlock the baggage carrier. Preferably, unloaded baggage carriers are transported in an unlocked state.

Further, the invention relates to a method for controlling baggage with a system described above. The method comprises the following steps:

In a first step, biometric features of a person are determined by a check-in identification unit in the baggage check-in area, an unambiguous biometric token is generated and the token is transmitted to the data processing unit.

In the next step, a baggage carrier with an unambiguous baggage ID is provided by a check-in unit, which is connected to the check-in identification unit, and the baggage ID is transmitted to the data processing unit.

In the next step, the biometric token and the baggage ID are received and associated by the data processing unit, and, optionally, stored in a correlation table.

In the next step, biometric features of a person are determined by a reclaim identification unit in the baggage reclaim area, an unambiguous biometric token is generated and the token is transmitted to the data processing unit.

In the next step, the token is received by the data processing unit, optionally, the validity is checked, the associated baggage ID is determined on the basis of the correlation table and the associated baggage ID is transmitted to a baggage reclaim station in the baggage reclaim area.

In the next step, the baggage ID is received by a reclaim unit, which is connected to the baggage reclaim station, and the corresponding baggage carrier is provided for removing the baggage.

This method according to the invention may have the features described above in connection with a system according to the invention.

The access of a person to the baggage check-in area may be guaranteed by the following steps:

In a first step, by reading a machine-readable access code on an authentication document, e.g. a boarding pass or passport, by a scanner in an access control area of the control area, and transmitting the access code to the data processing unit for checking the validity.

In a second step, by checking the validity of the access code by the data processing unit, and transmitting the result of the validity check to a blocking device in the access control area.

Provided that the access code is valid, access to the baggage check-in area is provided by the blocking device in a third step.

In a further method step, the data processing unit may associate the biometric token and the baggage ID with the transmitted access code in the correlation table.

In further method steps, the baggage carriers are transported by any conveyor system, e.g. a revolving conveyor belt, from the baggage check-in area to the baggage reclaim area via the baggage control area and back to the baggage check-in area.

In a further method step, the load condition and the degree of contamination of the baggage carriers are checked by a control device after the baggage reclaim area.

In a further method step, the baggage carriers may be stored in a buffer zone in the baggage reclaim area, in particular in the area of a baggage reclaim station, in order to avoid congestion.

Further features of the invention become apparent from the patent claims, the figures and the exemplary embodiment.

In the following, the invention is discussed in detail on the basis of an exemplary embodiment.

BRIEF DESCRIPTION OF THE DRAWINGS

In the figures:

FIG. 3 shows a schematic flow diagram of a method according to the invention.

DETAILED DESCRIPTION

Figure 1:
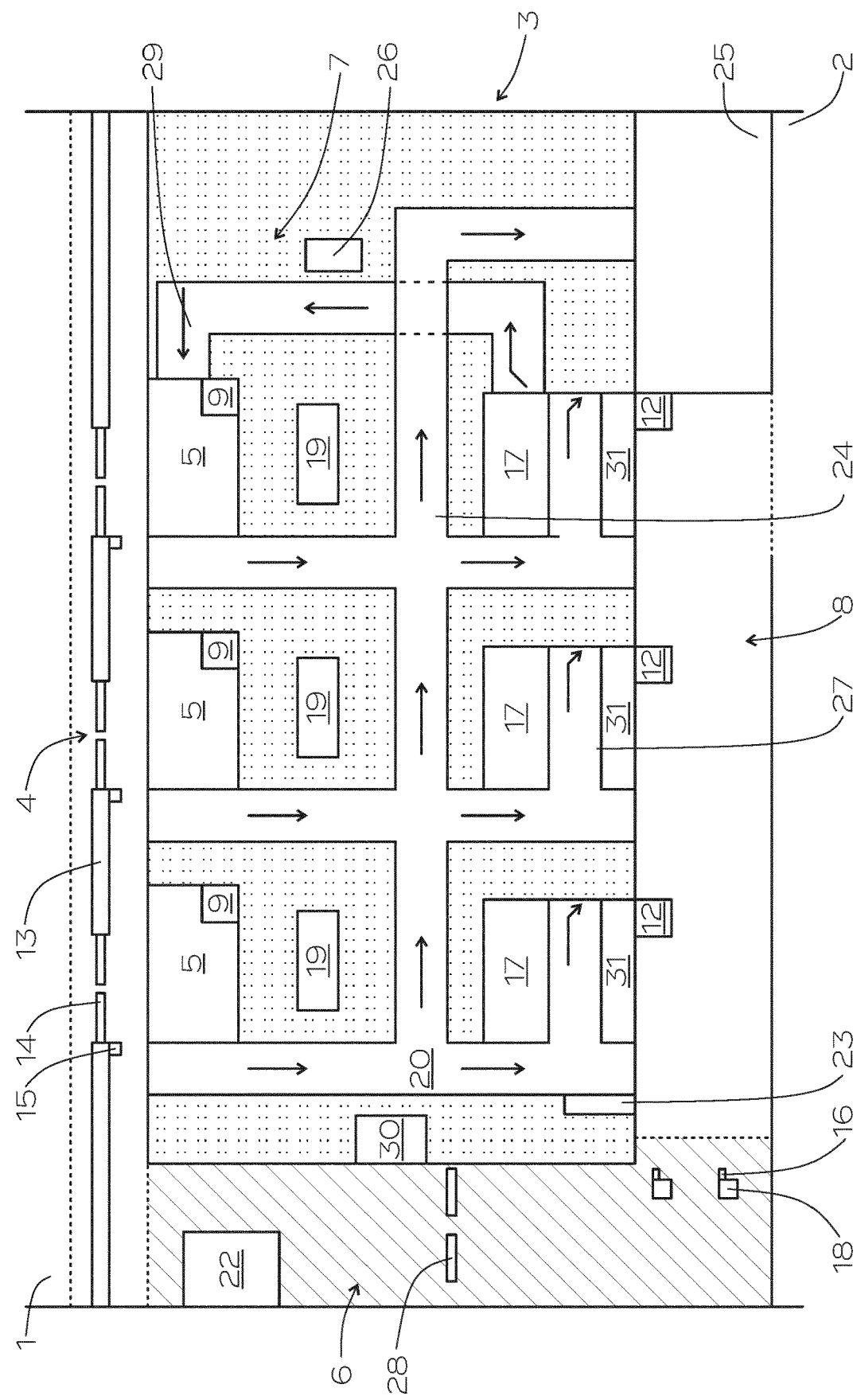
FIG. 1 shows a schematic view of an exemplary embodiment of a system according to the invention.

FIG. 1 schematically shows an exemplary embodiment of a system according to the invention with preferred features. The exemplary embodiment relates to a system at an airport. An application of the system to other facilities lies within the usual actions of a person skilled in the art and is therefore not explained in detail here.

In FIG. 1, a public area 1 is shown. In the public area 1, an entrance hall may be located, for example, which is open to the public. In order to get to the departure gates, which are located in the restricted area 2, people/passengers have to pass the control area 3, in which an identity and baggage control are performed. Typically, people carry only hand baggage, i.e. smaller suitcases, bags, wallets etc., since larger items of baggage have to be checked in at the baggage check-in located in the public area 1 and have to be transported directly to the airplane.

The control area 3 serves to control people in so far as it is checked whether they are authorized to enter the restricted area 2. Such an authorization may be determined on the basis of specific data in documents, e.g. identification documents or boarding passes. In the system according to the invention, the authorization check takes place in the access control area 4, in which multiple blocking devices 14 are provided, which are coupled to scanners 13. The scanners 13 are designed to scan boarding passes and allow a person access to the further control area 3 upon presenting a valid boarding pass.

On the scanners 13, further identification units 15 are provided, which are designed as cameras with a facial recognition unit. When scanning the boarding pass, biometric features of a person are registered via the further identification units 15, transmitted to a data processing unit 22 together with the information of the boarding pass, e.g. departure time, gate, destination etc., and stored in a correlation table. Subsequently, these data are associated with the baggage ID 10 of the baggage carrier 21 of this person.

After the access control, the separation into a flow of people and a flow of baggage takes place, as the examination of persons and their baggage 11 is carried out in completely separated structures. In FIG. 1, the area of the flow of people is hatched, while the flow of baggage is dotted. In principle, people are not supposed to have access to their baggage in the restricted area. The separation occurs in the baggage check-in area 5.

In this exemplary embodiment of the invention, multiple, spatially separated baggage check-in areas 5 are provided. In each baggage check-in area 5, a first check-in identification unit 9 with a camera and a facial recognition unit as well as an optional fingerprint scanner is provided, which registers the biometric features of a person. The person in the respective baggage check-in area 5 places their baggage 11 in a baggage carrier 21 provided by a check-in unit. This baggage carrier 21 is a closable box with a baggage ID 10, which is configured as a machine-readable code. Once the baggage 11 has been deposited, the check-in unit locks the baggage carrier 21.

The biometric features of the person are transmitted to the data processing unit 22 together with the baggage ID 10, associated with each other and stored in a correlation table in a nonvolatile memory. This correlation table is expanded with the data of the further identification unit 15 and the information of the boarding pass or access code and, optionally, further information.

While the people move into the identity control area 6 once they have checked-in their baggage 11, the locked baggage carrier 21 is transported into the baggage control area 7, where the examination takes place. In the baggage control area 7, conveyor belts 20 are provided, which transport the baggage carriers 21 with the baggage 11. Switch arrangements 24 are provided in order to change the destination of the baggage carriers 21, wherein the control is effected via a conveyor belt control system 23.

In the baggage control area 7, imaging examination units 19 are provided, which, in this exemplary embodiment, are configured as computer tomography units. They screen the baggage carriers 21. An analysis unit 30 is configured to assess whether the baggage 11 contains potentially dangerous items or substances. If the baggage 11 is considered safe, the conveyor belt 20 transports the baggage carrier 21 with the baggage 11 into one of the baggage reclaim stations 17 in the baggage reclaim area 8.

In this embodiment of the invention, a buffer zone 27 is provided in each baggage reclaim station 17 in order to receive and retain multiple baggage carriers 21.

In case the analysis unit 30 considers an item of baggage 11 potentially dangerous, it is diverted into a follow-up examination area 25. To this end, the analysis unit 30 is connected to the conveyor belt control system 23 in order to allow diversion. The analysis unit 30 is also connected to the data processing unit 22 and the correlation table may be expanded with information regarding the status of the baggage, e.g. the planned baggage reclaim area or the planned reclaim station or the assessment by the analysis unit 30.

In the meantime, the people pass the identity control area 6, in which identity control units 28 are provided. In this exemplary embodiment, the identity control units 28 are configured as full-body scanners with Terahertz cameras. After the identity control units 28, information output units 18 in the form of information pillars with a graphical display, e.g. screen or monitor, are arranged, which are equipped with further identification units 16. These further identification units 16 are configured as cameras with a facial recognition unit and recognize biometric features of a person. The further identification units 16 are connected to the data processing unit 22 and, once a person is recognized, the information output units 18 indicate, in accordance with the data in the correlation table, where the person's baggage 11 is located or where it can be picked up, or whether a manual follow-up control has to take place.

The baggage 11 may, according to the assessment by the analysis unit 30, be either in a baggage reclaim station 17 or in the follow-up examination area 25. Each baggage reclaim station 17 is spatially separated and reclaim identification units 12 in the form of cameras with a facial recognition unit, which are connected to the data processing unit 22, are provided for access control.

When a person is recognized, the biometric features are compared to the correlation table and access to the baggage reclaim station is approved by a reclaim unit 31. At the same time, the corresponding baggage carrier 21 is provided and unlocked for removing the baggage.

Once the baggage 11 has been removed, the empty baggage carrier 21 is transported back to the baggage check-in area 5. Prior to reaching the baggage check-in area 5, a control device 26 is provided, which checks whether the baggage carrier 21 is empty, i.e. whether baggage 11 has been left behind or has not been picked up, or whether the baggage carrier 21 is dirty. In case the baggage carrier 21 is not empty, a warning signal is emitted and/or employees are notified.

If it is not in a baggage reclaim station 17, the baggage 11 is in the follow-up examination area 25. Here, in the presence of the person, the baggage 11 is controlled manually.

After picking up the baggage 11, the person may leave the control area 3 via the exit 29 and enter the restricted area 2.

In this exemplary embodiment, the data processing units, i.e. in particular the identification units 9, 12, 15, 16, the scanner 13, the information output unit 18, the analysis unit 30, the imaging examination unit 19 and the data processing unit 22 are connected via an encrypted wireless data transfer interface, i.e. WLAN.

Figure 2:
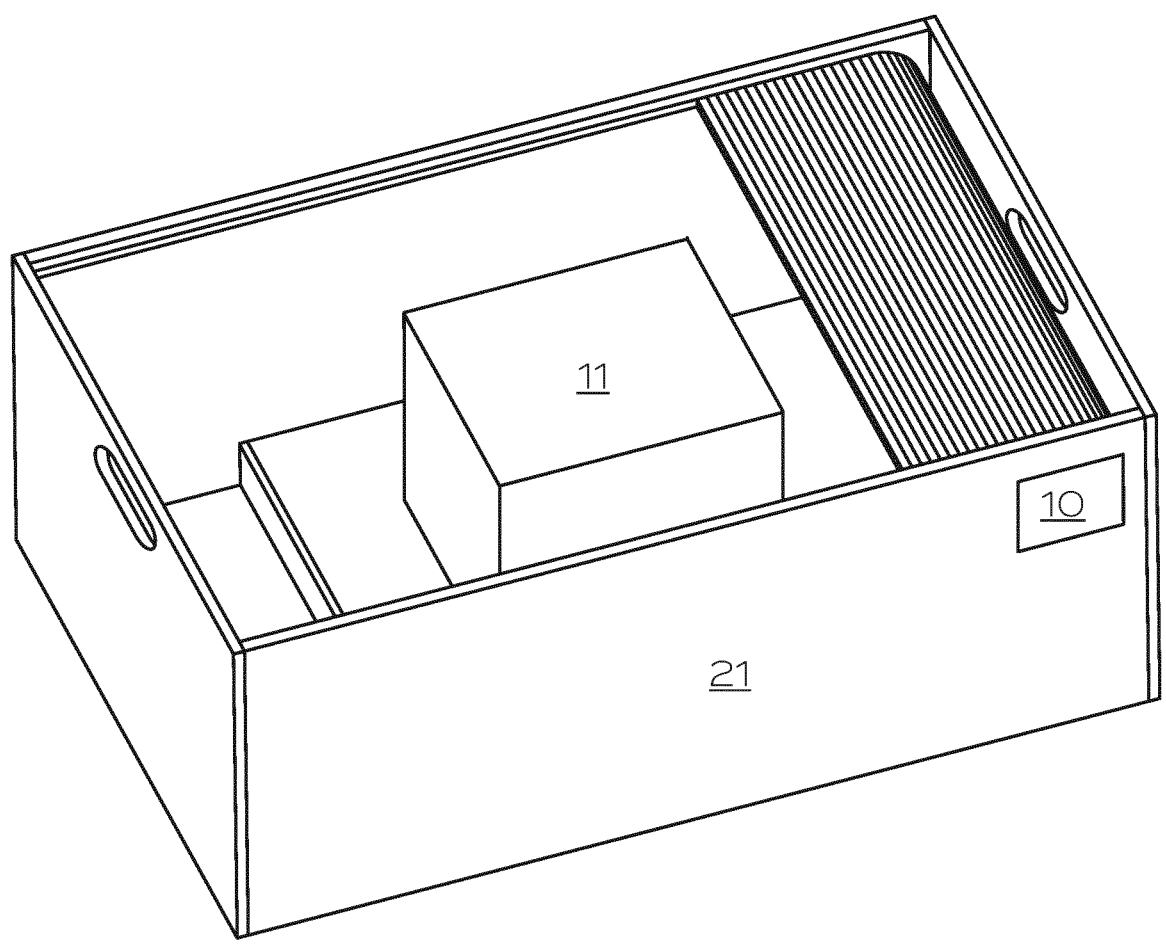
FIG. 2 shows a schematic view of a baggage carrier according to the invention.

FIG. 2 shows a schematic view of a baggage carrier 21 for the use in the described exemplary embodiment. The baggage carrier 21 is a plastic box, which can be locked and in which baggage 11 may be placed. On the baggage carrier 21, a baggage identifier 10 is arranged, which, in this exemplary embodiment, is a machine-readable code. The baggage carrier 21 comprises a lockable lid and sub-compartments for receiving smaller items.

FIG. 3 shows a schematic process flow diagram of a method according to the invention for controlling baggage. The flow of people A, baggage B and baggage carriers C in a control area 3 between a public area 1 and a restricted area 2 are shown.

First, with their baggage B, people A move into the access control area 4, in which the boarding pass and, optionally, identification documents are controlled. Already at this point, a biometric token of the person can be determined and stored in the correlation table. Subsequently, person A, with their baggage B, is guided to a conventional safety check 32 or to the baggage check-in area 5. In particular, the conventional safety check 32 may be carried out when person A refuses recording of their biometric data; it will not be described further in the following.

In the baggage check-in area 5, person A leaves their baggage B, wherein their biometric token is associated with the baggage/the used baggage carriers. To this end, a check-in identification unit 9 first determines the biometric features of person A, an unambiguous biometric token is generated therefrom and this token is transmitted to a data processing unit 22. A check-in unit, which is connected to the check-in identification unit 9, provides a baggage carrier 21 with an unambiguous baggage ID 10 for receiving baggage B and transmits the baggage ID 10 to the data processing unit 22. The person places their baggage in the unlocked baggage carrier 21 and leaves the baggage check-in area 5.

Now, person A passes an identity control area 6 with an identity control device 28. After the identity control, person A gets to an information output unit 18, which is connected to an identification unit 16. There, person A learns, for example after being identified on the basis of their boarding pass, at which reclaim unit 31 and at which baggage reclaim area 8 they can pick up their baggage, and then moves there.

In the meantime, baggage B in the locked baggage carrier C is transported into the baggage control area 7 via a conveyor belt 20. An examination by an imaging examination unit 10, for example a CT unit, takes place, wherein the baggage carrier 21 stays locked so that an unauthorized access to baggage B is not possible. Subsequently, on the basis of results of the imaging examination unit, it is decided, manually or automatically, for example by using artificial intelligence such as neuronal networks, whether a follow-up control of baggage B is necessary.

In case a manual follow-up control of baggage B is necessary, baggage B is transported into the follow-up examination area 25 via the transport belt 20. It may, but does not have to, be located in the baggage reclaim area 8 or adjacent to it. There, in the presence of person A, baggage B is checked manually. Subsequently, person A with their baggage B leaves the control area 3 and enters the restricted area 2.

In case no manual follow-up control of baggage B is necessary, baggage B is transported into the baggage reclaim area 8 via the conveyor belt 20 and there provided at a reclaim unit 31 if person A is correctly identified on the basis of their biometric data at the reclaim identification unit 12 of the baggage reclaim station 17. Subsequently, person A and baggage B leave the control area 3 and enter the restricted area 2.

Either after the reclaim unit 31 or after the follow-up examination area 25, the empty baggage carrier C leaves the baggage reclaim area 8 and is guided into a control device 26 via the conveyor belt 20, where it is automatically checked for dirt or damage and where it is determined whether it has actually been emptied. Subsequently, baggage carrier C is guided back to the baggage check-in area 5 for further use.

However, the invention is not limited to the illustrated exemplary embodiments, but rather comprises all systems and methods in the scope of the following patent claims.

LIST OF REFERENCE SIGNS

1 Public area
2 Restricted area
3 Control area
4 Access control area
5 Baggage check-in area
6 Identity control area
7 Baggage control area
8 Baggage reclaim area
9 Check-in identification unit
10 Baggage ID
11 Baggage
12 Reclaim identification unit
13 Scanner
14 Blocking device
15 Identification unit
16 Identification unit
17 Baggage reclaim station 18 Information output unit
19 Imaging examination unit
20 Conveyor belt
21 Baggage carrier
22 Data processing unit
23 Conveyor belt control system
24 Switch arrangement
25 Follow-up examination area
26 Control device
27 Buffer zone
28 Identity control device
29 Exit
30 Analysis unit
31 Reclaim unit
32 Conventional security check

The invention claimed is:

1. A system for controlling baggage at a transition from a public area to a restricted area, between which a control area comprises a baggage check-in area, an identity control area, a baggage control area, a baggage reclaim area and a data processing unit,
wherein
in the baggage check-in area, at least one check-in identification unit is configured to determine biometric features of a person, to generate an unambiguous biometric token therefrom, and to transmit the token to the data processing unit;
a check-in unit in communication with the check-in identification unit is configured to associate a baggage carrier with an unambiguous baggage ID for receiving baggage and to transmit the baggage ID to the data processing unit;
the data processing unit is configured to receive the biometric token and the baggage ID, to match them and, optionally, to store them in a correlation table;
in the baggage reclaim area, at least one baggage reclaim station comprises a reclaim identification unit configured to determine biometric features of a person, to generate an unambiguous token therefrom, and to transmit the token to the data processing unit;
the data processing unit is configured to receive the token and to determine the associated baggage ID based on the correlation table and to transmit the baggage ID to the at least one baggage reclaim station;
a reclaim unit in communication with the baggage reclaim station is configured to receive the baggage ID and to provide the associated baggage carrier for removing the baggage;
and wherein, for the transport of the baggage carrier, a conveyor system comprises a revolving conveyor belt, which passes from the baggage check-in area to the baggage reclaim area via the baggage control area and back to the baggage check-in area, and further comprises a control device on the conveyor belt after the baggage reclaim area, the control device configured to determine the load condition and the degree of contamination of a baggage carrier.

2. The system according to claim 1, wherein the check-in identification unit and the reclaim identification unit comprise cameras, microphones, finger print sensors or combinations of these devices, which are configured to detect biometric features such as in particular physical features, facial features, features relating to the iris, retinal features, vocal features and/or fingerprints of the person.

3. The system according to claim 1, wherein
the control area comprises an access control area, in which a scanner is arranged and configured to scan a machine-readable access code on an authentication document of a person and to transmit it to the data processing unit;
the data processing unit is configured to check the validity of the access code and to transmit the result of the validity check to a blocking device in the access control area; and
the blocking device is configured to allow the person access to the baggage check-in area provided that the access code is valid, and to deny it otherwise.

4. The system according to claim 3, wherein the data processing unit is configured to associate the biometric token and the baggage ID with the transmitted access code in the correlation table.

5. The system according to claim 1, wherein one or more additional identification units comprising cameras are provided in the access control area and/or in the identity control area, the identification units being configured to recognize biometric data of a person comprising non-contact features, such as physical features or facial features, to derive biometric data therefrom, and to transmit the biometric data to the data processing unit.

6. The system according to claim 1, further comprising multiple, spatially separated baggage reclaim areas and/or multiple, spatially separated baggage reclaim stations in each baggage reclaim area are provided.

7. The system according to claim 1, wherein, in the identity control area, at least one information output unit is provided, which is configured to display content of the correlation table.

8. The system according to claim 1, further comprising at least one imaging examination unit comprises a computed tomography (CT) scanner arranged in the baggage control area.

9. The system according to claim 1, further comprising a follow-up examination area for manual analysis of the baggage.

10. The system according to claim 1, further comprising a conveyor belt control system in communication with the data processing unit.

11. The system according to claim 1, further comprising multiple baggage reclaim stations, wherein a switch arrangement, connected to the conveyor belt control system, is provided for distributing baggage carriers among the baggage reclaim stations.

12. The system according to claim 1, further comprising, in the baggage reclaim area of a baggage reclaim station, a buffer zone is provided for intermediate storing of baggage carriers.

13. The system according to claim 1, wherein the baggage carrier can be locked, and wherein
the check-in unit is configured to lock the baggage carrier and
the reclaim unit is configured to unlock the baggage carrier.

14. A method for controlling baggage at the transition from a public area to a restricted area, between which a control area comprises a baggage check-in area, an identity control area, a baggage control area, a baggage reclaim area and a data processing unit, wherein the method comprises the following steps:
by a check-in identification unit in the baggage check-in area, determining biometric features of a person, generating an unambiguous biometric token, and transmitting the token to the data processing unit;

by a check-in unit, which is connected to the check-in identification unit, providing a baggage carrier with an unambiguous baggage ID and transmitting the baggage ID to the data processing unit;

receiving and matching the biometric token and the baggage ID by the data processing unit, and, optionally, storing in a correlation table;

by a reclaim identification unit in the baggage reclaim area, determining biometric features of a person, generating an unambiguous biometric token, and transmitting the token to the data processing unit;

receiving the token by the data processing unit, determining the associated baggage ID on the basis of the correlation table and transmitting the associated baggage ID to a baggage reclaim station in the baggage reclaim area;

receiving the baggage ID by a reclaim unit, which is connected to the baggage reclaim station, and providing the corresponding baggage carrier for removing the baggage;

wherein baggage carriers are transported by a conveyor system comprising a revolving conveyor belt, from the baggage check-in area to the baggage reclaim area via the baggage control area and back to the baggage check-in area, wherein the load condition and the degree of contamination of the baggage carriers are checked by a control device after the baggage reclaim area.

15. The method according to claim 14, wherein access of a person to the baggage check-in area is secured by the following steps:

scanning of a machine-readable access code on an authentication document by a scanner in an access control area of the control area, and transmitting the access code to the data processing unit for checking the validity;

checking the validity of the access code by the data processing unit, and transmitting the result of the validity check to a blocking device in the access control area; and provided that the access code is valid, enabling access to the baggage check-in area by the blocking device.

16. The method according to claim 15, wherein the data processing unit associates the biometric token and the baggage ID with the transmitted access code in the correlation table.

17. The method according to claim 14, wherein baggage carriers are stored in a buffer zone in the baggage reclaim area in the area of a baggage reclaim station.

18. The method according to claim 14, wherein the check-in unit locks the baggage carrier after deposition of the baggage inside it, and the reclaim unit unlocks the baggage carrier for removing the baggage.

* * * * *